(No Model.)
F. T & J. P. VANSTRUM.
NON-REFILLABLE BOTTLE.
No. 573,061. Patented Dec. 15, 1896.
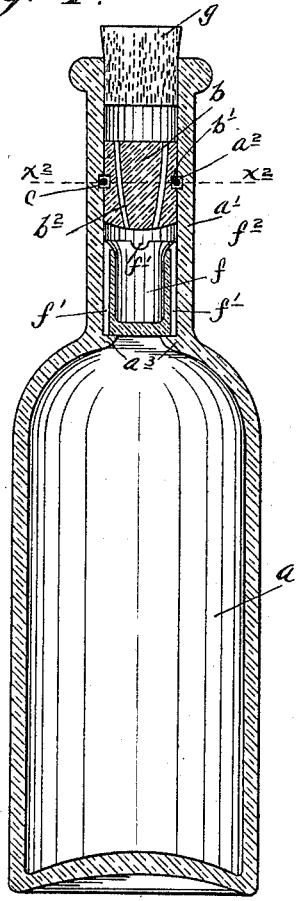
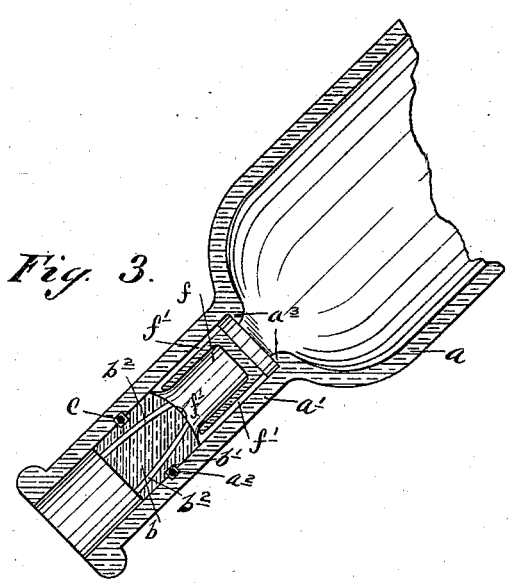
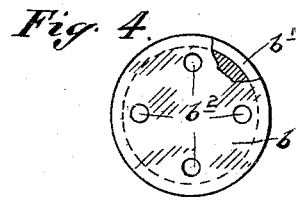
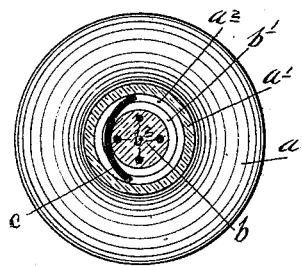
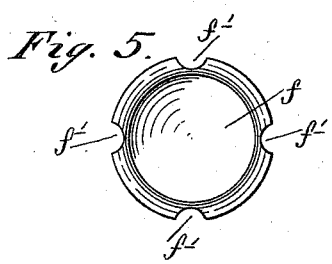
Witnesses.
Harry Kilgore,
Frank D. Merchant,
Inventors.
Fredrick T. Vanstrum,
John P. Vanstrum,
By their Attorney,
Jas. F. Williamson.

UNITED STATES PATENT OFFICE.

FREDRICK T. VANSTRUM AND JOHN P. VANSTRUM, OF MINNEAPOLIS, MINNESOTA.

NON-REFILLABLE BOTTLE.

SPECIFICATION forming part of Letters Patent No. 573,061, dated December 15, 1896.

Application filed February 20, 1896. Serial No. 580,012. (No model.)

*To all whom it may concern:*

Be it known that we, FREDRICK T. VANSTRUM and JOHN P. VANSTRUM, citizens of the United States, residing at Minneapolis, in the county of Hennepin and State of Minnesota, have invented certain new and useful Improvements in Non-Refillable Bottles; and we do hereby declare the following to be a full, clear, and exact description of the invention, such as will enable others skilled in the art to which it appertains to make and use the same.

Our invention relates to non-refillable bottles, and has for its object to provide an improvement in this class of bottles and similar vessels whereby it is rendered impossible after the vessel has once been filled to add to the contents thereof, or after the original contents have been removed therefrom to again refill the bottle.

To these ends our invention comprises the novel devices and combinations of devices hereinafter defined, and pointed out in the claim.

The preferred form of our invention is illustrated in the accompanying drawings, wherein, like letters referring to like parts throughout the several views—

Figure 1 is a central vertical section taken through a bottle shown as equipped with our invention. Fig. 2 is a horizontal section taken on the line $X^2 X^2$ of Fig. 1. Fig. 3 is a view similar to Fig. 1 except that the bottle is shown turned upside down or in its pouring position and that some parts are broken away. Fig. 4 is a detail in plan view showing the lock-stopper removed from the bottle, and Fig. 5 is a detail in plan view showing the cup-shaped sealing-valve also removed from the bottle.

$a$ indicates the body, and $a'$ the neck, portion of a bottle. The interior of the neck portion is formed at its intermediate portion with a lock-channel or detent-groove $a^2$, and terminates at its lower portion, as shown, at a point just above where it merges into the body $a$ in an abrupt annular ledge $a^3$, which, as will later appear, constitutes a valve-seat.

$b$ indicates a lock-stopper which, as shown, is provided with a peripheral groove $b'$ and with a series of longitudinal perforations or liquid-passages $b^2$. This lock-stopper $b$ is of such diameter that it snugly fits into the passage of the bottle-neck, and may be secured in its locked position with said neck by means of a short spring-lock rod $c$, as shown in the drawings. This lock-rod $c$ may be formed from a straight piece of spring-wire or from a flat piece of spring metal.

In placing the lock-stopper into position in the bottle-neck the spring-rod $c$ is wrapped or bent into the groove $b'$ of said stopper, and the stopper is then forced into the bottle-neck. When the stopper $b$ is forced inward to a point where its groove $b'$ registers with the detent-groove $a^2$ of the bottle-neck, the ends of the spring-lock rod $c$ will spring outward into engagement with said detent-groove $a^2$. By this means the lock-stopper $b$ is locked in position and cannot be removed from the bottle-neck without breaking either said stopper or said neck portion.

$f$ indicates a cup-like sealing-valve which is mounted in the neck portion $a$, open end upward, with freedom for limited longitudinal movement between said lock-stopper $b$ and the annular ledge or seat $a^3$. The sealing-valve $f$ is provided on its periphery with a series of longitudinal grooves $f'$, which are in depth less than the width of the ledge or annular valve-seat $a^3$, and at their upper extremities are cut through the walls of said valve, so that the liquid may flow through said grooves $f'$ when the valve is thrown against the lock-stopper, as shown in Fig. 3.

In the natural or upright position of the bottle, as shown in Fig. 1, the lower end of the sealing-valve $f$ rests on the ledge or valve-seat $a^3$ and coöperates therewith to form a liquid-tight joint.

From the above it will be seen that the valve $f$, coöperating with its seat $a^3$, will effectually prevent the introduction of any fluid into the bottle after said valve and locking-stopper have been placed in working positions. The most important feature of our invention, however, resides in the form of the valve $f$ and the arrangement of the passages in the locking-stopper $g$, so as to discharge directly into the cup of said valve when a liquid is forced inward through the same.

The bottle must, of course, be filled before the sealing devices are applied thereto. Portions of the original contents may from time to time or all at one time be removed from the bottle by inverting the bottle, as shown in Fig. 3. In this position the cup-like valve $f$ removes from the seat $a^3$ and permits the liquid to flow outward through the under members of the valve-grooves $f'$ and stopper-passages $b^2$, while air may flow inward through the upper members of said passages $b^2$ and grooves $f'$ to take the place of the outflowing liquid and hasten the outflow of the same.

Suppose, for example, it is attempted to force a liquid into the interior of the bottle after its contents have been either wholly or partly removed. In this case the liquid must first pass through the passages $b^2$ in the lock-stopper $b$ and will be discharged into the cavity of the cup-like sealing-valve $f$. The force and weight of the liquid caught by the cup-like valve will increase its weight, thereby insuring its proper closing movement and more tightly seating the same.

Even in the case of a bad joint between the valve $f$ and its seat $a^3$, in which case a small amount of liquid might be slowly forced into the bottle, liquid could not be introduced into the bottle without detection, for it is absolutely necessary to fill the cavity of the cup-shaped sealing-valve before the liquid could be forced through this bad joint, and in order to empty this cup-like valve it would be necessary to turn the bottle upside down, in which case the contents of the bottle would flow outward much more rapidly than it could be replaced by the above operation. If this cup-like valve should be allowed to remain filled or partially filled with a liquid, it would be a certain proof that the bottle had been tampered with.

$g$ indicates a cork which may be inserted into the mouth of the bottle in the ordinary manner after the sealing devices above described have been placed in working position.

It will be noted that the walls of the cup-shaped sealing-valve are sharpened or beveled outward at the open end of said valve. This manner of cutting the walls away causes the outer ends of the longitudinal grooves $f'$ to cut through the walls of the valve before reaching the extremity of the same, and thus to form notches therein. These notches prevent the longitudinal passages $f'$ from being closed when the valve is moved against the lock-stopper, as shown in Fig. 3 of the drawings.

It will be understood, of course, that various alterations in the details of construction may be made without departing from the spirit of our invention.

What we claim, and desire to secure by Letters Patent of the United States, is as follows:

The combination with a bottle provided in its neck-passage with the valve-seat $a^3$, of the gravity-actuated cup-shaped sealing-valve $f$, formed with the longitudinal peripheral grooves $f'$, and having the walls of its open end beveled or sharpened outward so as to form notches at the outer ends of said grooves $f'$, and the lock-stopper $b$ securable in the neck of said bottle and provided with a multiplicity of fluid-passages $b^2$ extending completely through the body of said stopper, eccentric to its center, but in position to discharge into the cavity of said valve substantially as described.

In testimony whereof we affix our signatures in presence of two witnesses.

FREDRICK T. VANSTRUM.
JOHN P. VANSTRUM.

Witnesses:
JAS. F. WILLIAMSON,
F. D. MERCHANT.